June 4, 1963　　　G. D. KOEIJMANS　　　3,092,805
SEQUENTIAL SEISMIC CORRECTION MEANS
Filed June 27, 1957　　　　　　　　　　　4 Sheets-Sheet 2

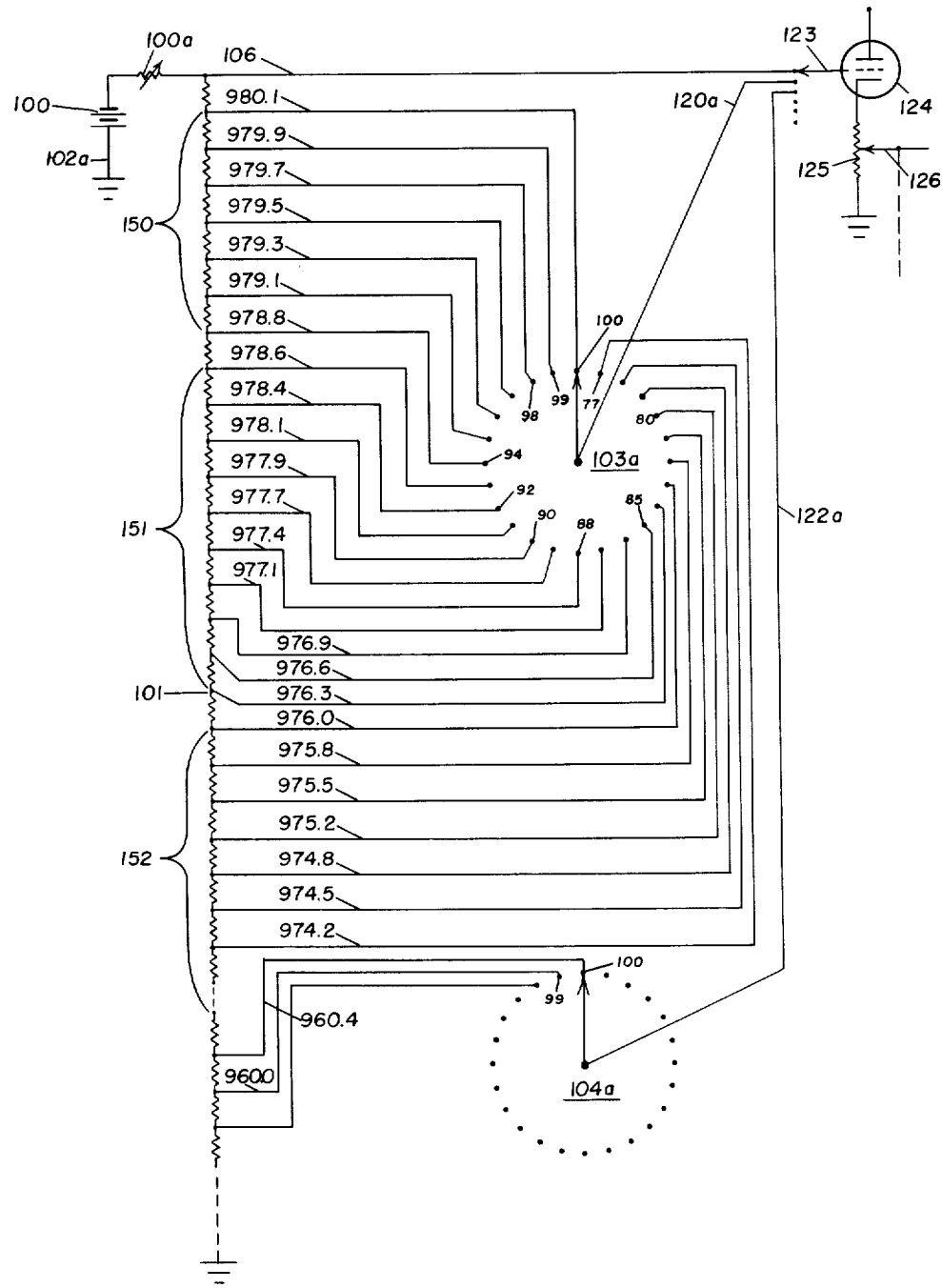

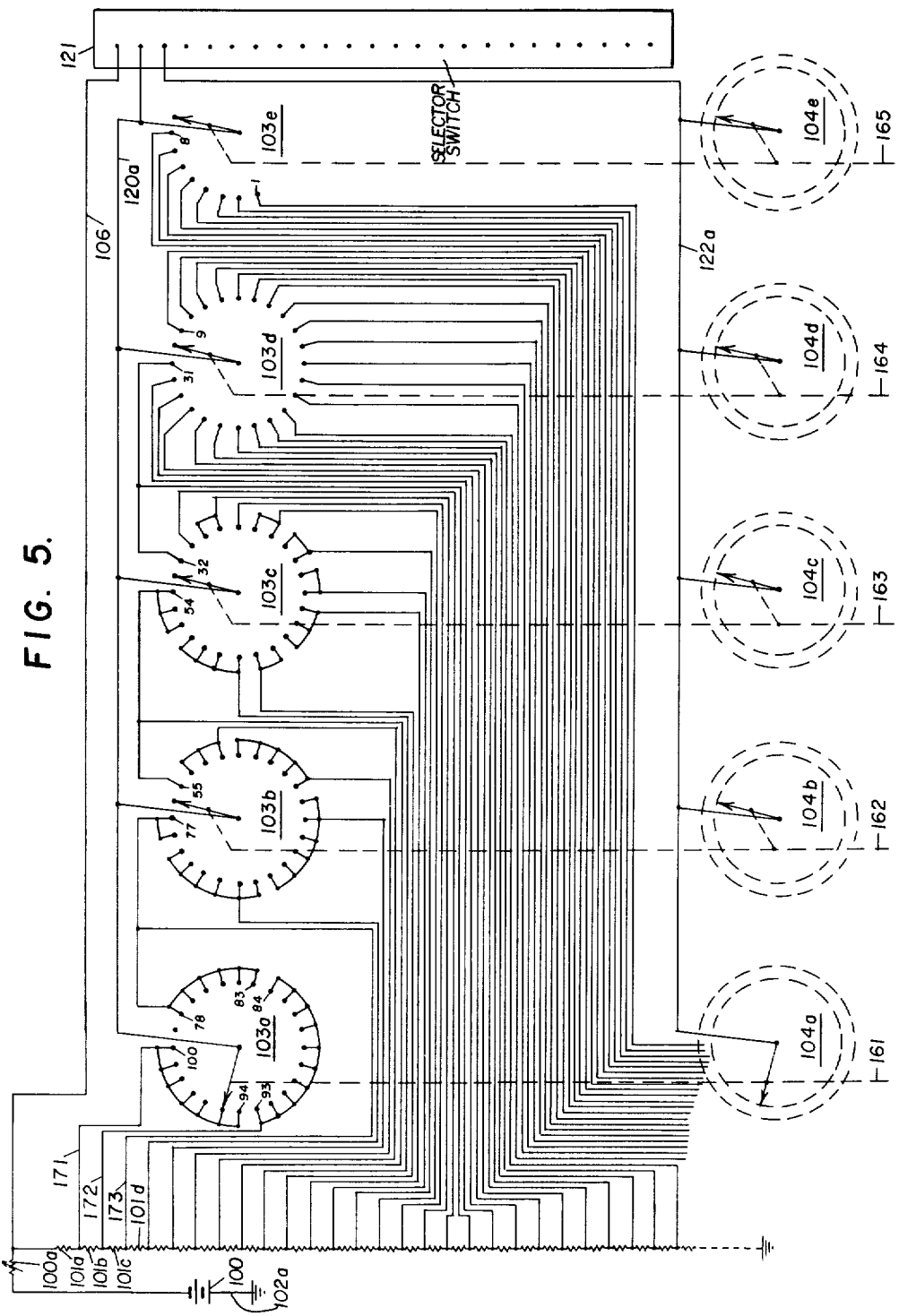

United States Patent Office 3,092,805
Patented June 4, 1963

3,092,805
SEQUENTIAL SEISMIC CORRECTION MEANS
Gerard D. Koeijmans, Dallas, Tex., assignor, by mesne assignments, to Socony Mobil Oil Company, Inc., New York, N.Y., a corporation of New York
Filed June 27, 1957, Ser. No. 668,520
7 Claims. (Cl. 340—15.5)

This invention relates to the automatic correction of multitrace seismograms and more particularly to a system for correcting records based upon widely differing field set parameters by employing means for generating families of correcting functions of predetermined but different relationships based upon the different field parameters.

Seismic signals recorded in phonographically reproducible form may be treated in various ways in order to place field data in more readily useable form. A final product often is a seismic record section in which signals from each of a large number of seismic detecting stations are employed such that variations in such signals may be considered as a graphical representation of subsurface velocity layering. In providing such record sections it is desirable that each individual seismic signal be corrected to a common basis or datum. Ambiguities introduced by variables such as the weathering of the near surface layer along a traverse, differences in spread geometry, and velocity transitions as a function of depth may be eliminated.

The present invention is primarily related to correcting seismic signals for variations in subsurface velocity transitions and for spread geometry. Other functions may be included along with the basic corrections herein provided. The problem, though one long recognized, has been ponderous when approached on an analogue basis for the reason that procedures in the field may vary from one location to another along a traverse which may be miles in length and thus involve many different observations. Each such variation may require a new analogue system and require a separate mechanism if necessary corrections are to be made automatically.

In accordance with the present invention there is provided a system for correcting seismic signals which may be utilized for most situations involving practical spread geometry although it will be found preferable that uniform spacing be maintained between detecting stations in a given seismic spread.

In one form, a system is provided for the correction of any seismogram where spread distance between a generating station and the most remote detector does not substantially exceed a distance equal to 100 times the spacing between adjacent geophones in the spread. Seismic records produced with any spread geometry in which the ratio of maximum spacing to detector interval is smaller than the above limit may be accommodated.

In such system operations are based upon (1) the availability of information as to variations in acoustic velocity with depth, and (2) the recognition that a correction for spread geometry is necessary and that the ratio of the lengths of paths minus twice the vertical travel distance traveled by reflected seismic energy from a shot point to geophones spaced different distances from the shot point is proportional to the ratio of the squares of the surface separations between the shot point and the detecting stations.

More particularly in accordance with the present invention, there is provided a system in which at least two signals are generated sequentially, which signals are respectively representative of seismic waves appearing at a first detecting station and at a second detecting station which is spaced a distance from the source of the seismic waves which is different from the distance from said source to said first station. Means are provided for producing a physical condition such as a voltage. The relative time occurrence of components of signals detected at the first station are then adjusted in dependence upon the product of the physical condition and a correcting function preselected for the path of seismic waves traveling from said source to said first station. Between the generation of the two signals, means are provided for modifying the physical condition in proportion to the ratio of the squares of the distances between the source and the stations at which the two signals were detected. Thereafter the relative time occurrence of components of signals detected at the second station are adjusted in dependence upon the product of the modified physical condition and the preselected correcting function. The signals as modified are then recorded on a common medium.

In a further aspect of the invention there is provided a means for generating a correcting condition or function ($F_n$) which comprises an impedance with an electrical source connected to the impedance for establishing at points therealong conditions of differing magnitudes. Means are provided for independently selecting a plurality of different groups of the points such that in each group of points there is established a relationship $F_k/F_n$ between the magnitudes of the conditions at successive points $X_0, X_1 \ldots X_n$, which is given by the equation $$F_k/F_n = \left(\frac{X_k}{X_n}\right)^2$$

where $k$ is an integer representative of the position of any point in any of said groups of points in its numerical order; and $n$ is an integer representative of the position of the point of highest numerical order.

In a still further aspect of the invention there is provided a correction system for seismic signals produced sequentially in which an ordered sequence of voltages of predetermined relationships one to another determined by the geometry of the seismic detecting spread are applied to terminals of a multi-terminal switch. As the seismic signals are sequentially produced, the switch is actuated step-wise to modify a correcting function which has been preselected for geometrical correction of the paths of travel of each seismic wave to a common base. In response to the modified correcting function, components of each said signal are shifted in time relative to each other and each corrected signal is then recorded. In a preferred form of the invention a magnetic storage system is provided with recording and detecting heads which are relatively movable with respect to each other in dependence upon the modified correcting function.

For a more complete understanding of the present invention and for further objects and advantages thereof, reference may now be had to the following description taken in conjunction with the accompanying drawings in which:

FIG. 4 is a detailed circuit diagram of a portion of the control impedance of FIG. 1; and FIG. 5 is a more detailed diagram of a portion of the switching arrangement of FIG. 4.

The following description will pertain to the correction of seismic signals for spread geometry and for variations in velocity of subsurface strata. Specifically, a multitrace seismogram of 24 traces will form the basis of this description wherein the corrected signals are to be rerecorded to form a corrected multitrace seismogram.

Figure 1:
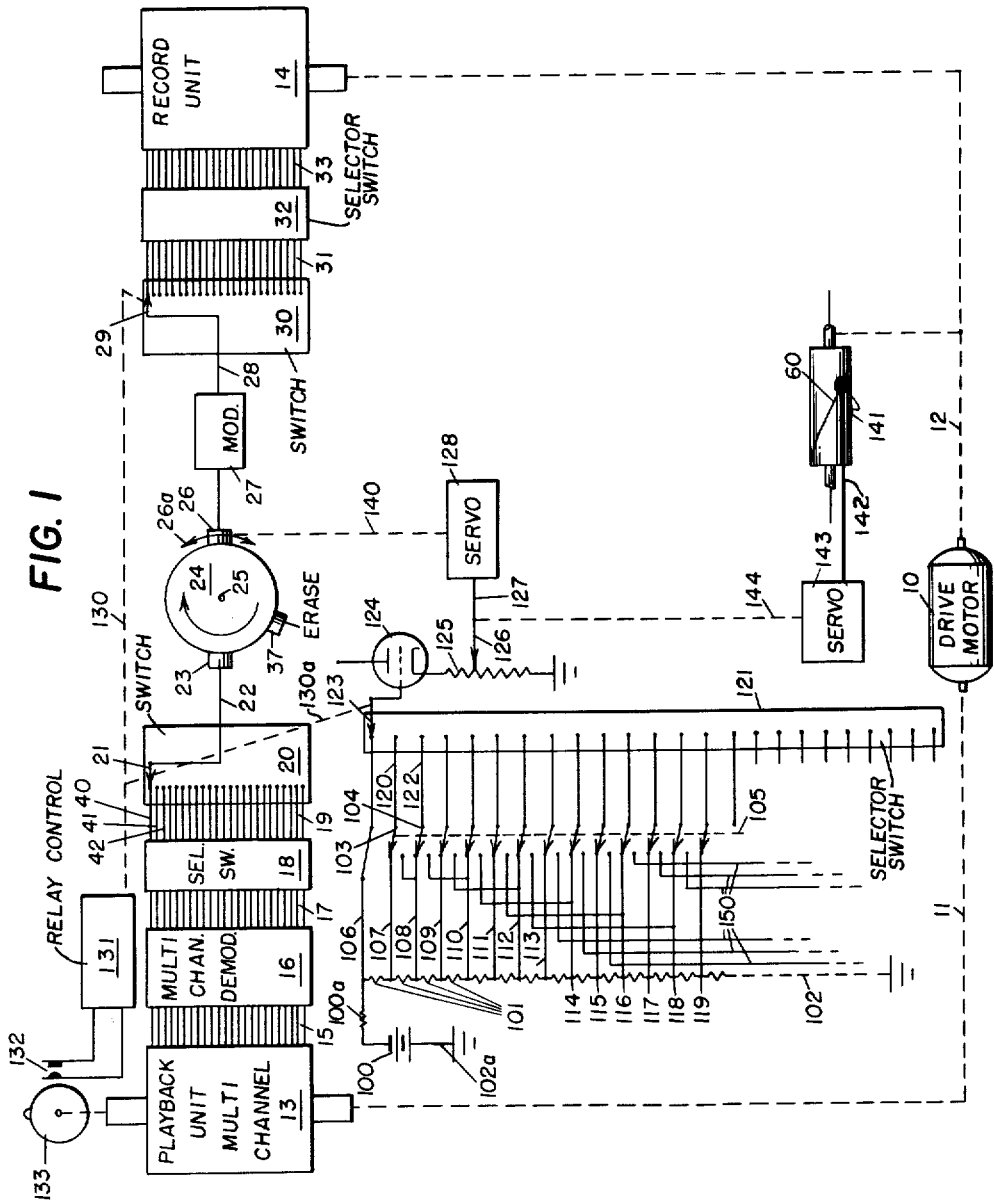
FIG. 1 is a schematic diagram partially in block form of a system embodying the present invention.

Referring to FIG. 1, a motor 10 actuates drive couplings 11 and 12 to drive a playback drum 13 and recording drum 14, respectively. Drum 13 is driven at a constant speed so that seismic signals recorded on a suitable phonographically reproducible medium placed on drum 13 may be repeatedly produced. Output signals appearing on channels 15 are applied to a multichannel demodulator 16 and thence by way of channels 17 to a selector switch unit 18. Signals from selector switch 18 are then connected by channels 19 to each of 24 contacts on a multicircuit switch 20.

Switch 18 is provided in order that any signal regardless of its physical location on the record on drum 13 may be connected ultimately to any selected terminal of switch 20 whereby any desired sequence of playback and correcting operations may be carried out.

As illustrated, selector switch 20 has a single selector contact 21 and output channel 22 which leads to a recording head 23. Recording head 23 preferably is adapted to provide a magnetic record on a recording drum 24 which is mounted to rotate around axis 25 at a constant speed. A detector head 26 positioned adjacent the periphery of drum 24 is adapted to detect signals recorded on the drum by record head 23. An erasing head 37 is provided to obliterate the magnetic record to permit the continuous recording, detection, and erasure of signals derived from the playback unit 13. A single channel modulator 27 is connected to detecting head 26 and by way of output channel 28 to the switch arm 29 of a multicircuit selector switch 30. Separate channels such as channels 31 extend from the terminals of the multicircuit switch 30 to a multichannel selector switch 32. The output of selector switch 32 is applied by way of channels 32 to recording unit 14.

The system thus far described represents a single channel system for reproducing a seismic signal, delaying the seismic signal by a time interval required for a given segment on drum 24 to rotate from the location of recording head 23 to the location of detecting head 26 and then to rerecord the delayed signal on a new record on record unit 14.

In accordance with the present invention a system is provided for correcting seismic signals which may appear at the output of switch 18 as on channels 40, 41, 42, etc., automatically in sequence to the same datum or time base.

Figure 2:
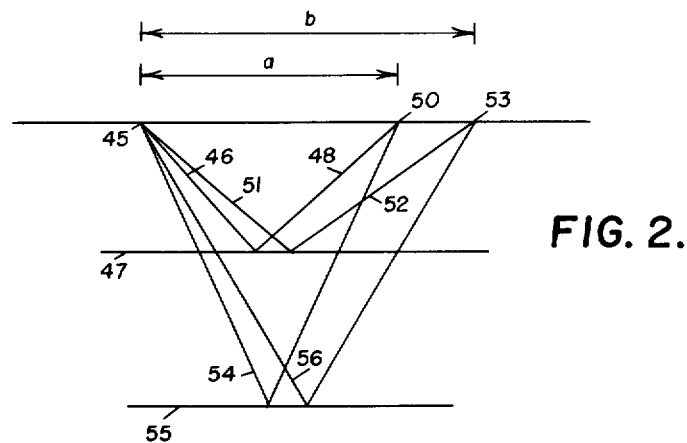
FIG. 2 is a diagram illustrating spread geometry.

FIG. 2 has been provided in order that the necessary corrections may be better understood. In FIG. 2 seismic waves originating at a seismic generating station 45 travel by way of ray path 46 to a first reflecting horizon 47 and upon reflection then travel by way of path 48 to a first detecting station 50. Seismic waves also travel by way of path 51 and reflection path 52 to a second detecting station 53. Correction is herein provided for the difference in the lengths of paths 46, 48 and 51, 52. It will be readily recognized that the ratio of the lengths of such paths minus twice the vertical distance is proportional to the ratio of $$\frac{a^2}{b^2}$$

where $a$ and $b$ are the distances from the source 45 to points 50 and 53, respectively. It will also be seen that seismic waves travel from source 45 to detecting station 50 by way of path 54 which leads to a reflecting point on a reflecting horizon 55. Signals similarly travel from source 45 to detecting station 53 by way of path 56 which leads to a reflecting point on horizon 55. In accordance with the present invention a correction is made automatically and sequentially for the difference between the lengths of paths 54, 56 and the lengths of paths 46, 48 and 51, 52. Geometrically it may be shown that the lengths of the reflection paths followed by waves from source 45 to detecting station 53 increase generally hyperbolically as a function of time. If point 53 represents the most remote detecting station from source 45, curve 60 (FIG. 3) may be taken as representative of variations of path length L as a function of time after generation of seismic waves at point 45. Curve 61 having the same general characteristics as curve 60 may be taken as representative of variations with time of the length of reflection travel paths for waves traveling from source point 45 to detecting station 50. Thus a whole family of curves having the same argument may be provided for describing the variation in the length of travel paths of seismic waves to each of a plurality of stations spaced different distances from a source of seismic waves all as a function of time following the generation of such seismic waves.

The system now to be described in connection with FIG. 1 takes into account the variation in travel path lengths by reason of geometry alone, i.e., the ratio of $$\frac{a^2}{b^2}$$

Figure 3:
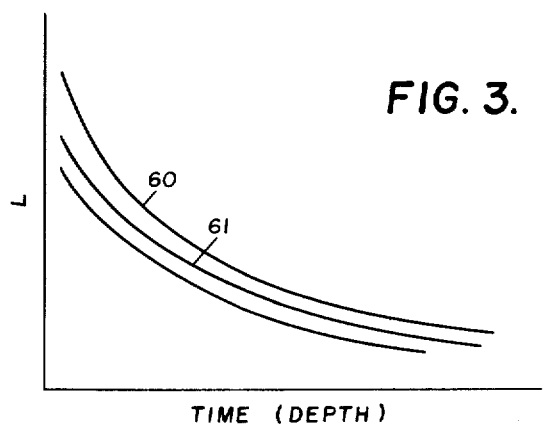
FIG. 3 illustrates a family of control functions preselected for correcting travel path such as illustrated in FIG. 2 to the equivalent vertical travel path.

(Fig. 2), and also the variation in the length of such travel paths as a function of time, such variations being represented by the functions plotted in FIG. 3.

A source of unidirectional voltage such as battery 100, FIG. 1, controlled and regulated, is connected at one terminal to a resistor 100a and thence to a multitapped resistor 101 and thence by way of conductor 102 to a reference voltage which is shown in FIG. 1 as ground. The other terminal of source 100 is connected by way of conductor 102a to ground. Thus the voltage across the resistor unit 101 will be maintained constant at all times. Voltages from various taps or points along the resistor unit 101 are applied to a plurality of switches such as switches 103 and 104. Switches 103, 104, etc. are coupled together by means indicated by dotted line 105 as to be simultaneously actuated.

Switches 103 and 104 are shown as single circuit, two position switches in FIG. 1. The upper end of resistor 101 is connected by lead 106 to the upper terminal of a switch 121. A conductor 107 connects a first tap on resistor 101 and the upper terminal of switch 103. The ratio of the resistance between conductor 107 and ground to the resistance between conductor 106 and ground is selected as to be equal to the ratio of the square of the distances between a seismic source and the location of detecting stations. Assuming that the first signal to be reproduced and appearing on channel 40 is a signal from a detector most remote from a seismic source and that the signal on channel 41 represents seismic waves detected at a station adjacent the most remote station and that the ration of the distances to such stations is 100:99, respectively, then the voltage between conductor 106 and ground will bear the same relationship with respect to the voltage between conductor 107 and ground as $100^2$ bears to $99^2$. It will thus be seen that the voltages between each of the conductors 106 and 107 and ground are constant. The circuit arrangement thus provides a plurality of constant voltage sources, the ratio of one to the other being proportional to the ratio of the square of the distances between the seismic source and the detecting stations. With the resistance between conductor 106 and ground of 1,000 ohms, the following is a tabulation of the approximate resistances appearing between conductors 106–119 and ground for correction of signals obtained at the remote end of a spread spanning the interval spaced from a shot point from 76 to 100 geophone intervals.

Table I

| Conductor | R to Ground | R to Ground In 2.5 Ohm Steps |
|---|---|---|
| 106 | 1,000 | 1,000 |
| 107 | 980 | 980 |
| 108 | 960 | 960 |
| 109 | 940 | 940 |
| 110 | 921 | 922.5 |
| 111 | 902 | 902.5 |
| 112 | 883 | 882.5 |
| 113 | 864 | 865 |
| 114 | 846 | 847.5 |
| 115 | 828 | 827.5 |
| 116 | 810 | 810.0 |
| 117 | 792 | 792.5 |
| 118 | 774 | 775 |
| 119 | 757 | 757.5 |

Similar points, not shown in FIG. 1, connected to suitable selector switches such as switch 103 will provide a continuation of the scaled order shown at the end of the above table.

Selector switch 103 is connected by channel 120 to the second terminal on stepping switch 121. Similarly switch 104 is connected by conductor 122 to a third terminal on switch 121. Similarly, the remaining switches actuated by coupler 105 are connected to terminals on switch 121. As earlier indicated, the present description applies to the correction of a 24 trace seismogram in which 24 terminals are provided for the contact of the selector arm 21 in switch 20 and of the selector arm 29 in switch 30. Consistent therewith, 24 switches such as switch 103 will be provided for actuation by control coupler 105.

A selector arm 123 of switch 121 is connected to the control grid of tube 124 connected as a cathode follower. The cathode resistance 125 is a potentiometer connected at one extremity to the cathode of tube 124 and at the other extremity to ground. By this means the voltages at the various taps on resistance 101 may be made to appear successively across resistor 125 by sequential stepping of arm 123 along the terminals of switch 121.

A variable tap 126 provided for potentiometer 125 is connected by channel 127 to a servomechanism 128. Thus the voltage from source 100 is applied through conductor 106, switch arm 123, and cathode resistance 125 to the arm 126 and thence to servomechanism 128.

It will now be noted that the arm 21 of switch 20, arm 29 of switch 30 and arm 123 of switch 121 are linked together as represented by the dotted lines 130, 130a and are actuated under the control of a stepping relay control unit 131. Control unit 131 is actuated simultaneously to move contact arms 21, 29 and 123 one step for each cycle of the playback unit 13. Such control is diagrammatically represented by the cam wheel 133 coupled to the playback unit 13 and adapted to close contacts of a switch 132 at the end of each complete cycle of the playback unit 13.

Assuming that a 24 trace seismogram is cyclically reproduced by playback unit 13, the signals therefrom would be recorded on drum 24 sequentially. In synchronism therewith the tap 123 would apply succeedingly smaller voltages to the grid of tube 124 so that the voltage appearing at the input of servomechanism 128 would be successively less for each cycle of the playback unit 13.

Servomechanism 128 coupled as indicated by the dotted line 140 to the detecting or playback head 26 is adapted to move playback head 26 as indicated by arrow 26a in dependence upon the magnitude of the voltage appearing on conductor 127. The sense of the operation is that the delay introduced in the recording and reproducing of each signal on drum 25 is increased as switch 123 is moved step-wise down the contacts in switch 121 to apply a first correction function to the input of servomechanism 128.

A second correction function for a seismogram involves the use of curves such as shown in FIG. 3. Curve 60 of FIG. 3 represents variation in travel path length for signals arriving at the most remote geophone in a given spread. Such a function is derived from a curve follower unit 141 driven from motor 10 cyclically and in synchronism with playback unit 13 and recording unit 14. A voltage is thus produced by the curve follower unit 141 and applied by channel 142 to a servomechanism 143. Servomechanism 143 is coupled as indicated by the dotted line 144 to the variable tap 126 on potentiometer 125. Thus the tap 126 will be moved over the potentiometer 125 repetitively in cycles corresponding with curve 60.

Thus as the voltage applied to the potentiometer 125 is decreased by movement of the selector arm 123 downward along switch 121, the effect is to produce at the input to servomechanism 128 a family of curves such as those represented by curves 60, 61, etc., FIG. 3. By this means signals appearing on channels 40, 41, 42, etc. may be applied to the delay drum 24 in sequence. A time delay which is dynamically varied in dependence upon curve 60 and which is varied step-wise in response to geometrical correction through the use of switch 121 is thereby introduced so that the signals to be rerecorded on unit 14 will appear the same as if all travel paths had been vertical, thus eliminating geometrical distortion.

The foregoing description with respect to the impedances at the junctures of element 101 and conductors 106–119 has been based upon the assumption that a 24 detector spread was employed with the most remote detector 1–100 detector spacings from the associated seismic shot point.

The present system may readily accommodate any arrangement of detectors up to the above-identified limit where the ratio of the distance from the shot point to the remote detector in the spread to the spacing of adjacent detectors does not exceed 100.

Referring again to FIG. 1, assume now that the signal on channel 40 is a signal from a detector which is 50 geophone intervals or spacings from a shot point and that signals from detectors numbered 49 and 48 in such a spread appear on channels 41 and 42, respectively. In this case the proper voltages would be applied to the terminals of switch 121 by actuating switch coupler 105 so that the contact arms would be moved to the lower position of each switch 103, 104, etc. When this is done, with the cross connections represented by conductors 150, the impedances between ground and the lower taps of switches 103, 104 and the remaining switches actuated by coupler 105 would be in the ratio of $$\frac{49^2}{50^2} \times 1000; \text{ and } \frac{48^2}{50^2} \times 1000$$

with a similar pattern repeated throughout the successive switches. It will thus be seen that the same impedance points on element 101 may fit or approximate the impedance desired for two or more points on switches 103, 104, etc.

In FIG. 4 there is illustrated a switching system adaptable to any practical geophone spread arrangement. Switch 103a may be taken as a 24 terminal counterpart of two terminal switch 103, FIG. 1; similarly, switch 104a is the counterpart of switch 104, FIG. 1. It is to be noted that each of the contacts on switch 103a taken in a counterclockwise direction are connected to points on impedance 101 of progressively decreasing impedance. If the impedance between ground and the upper end of resistor 101 is 1,000 ohms, the conductor connected to the switch contact bearing the indicia 100 will be at an impedance of 980.1 ohms above ground. The contact 100 of switch 104a is connected to an impedance point of 960.4 ohms. Thus switches 103a and 104a together with similar additional switches similarly connected at the "100" terminals thereof will be connected to successively decreasing resistance points when the detector remote from a shot point is 100 geophone spacings from the shot point. The ratio of 980.1:1000 is the ratio of $99^2:100^2$. The ratio of 960.4:1000 as applied to switch 104a is the same as $98^2:100^2$.

If the remote geophone is 99 geophone spacings from the shot point, then contact arms of switches 103a and 104a would be moved to terminals bearing indicia 99. The impedance would thus automatically be determined so that the impedance level appearing on conductors 120a, 122a, etc. will be in the same ratio as the squares of the distances to the respective detectors from the shot point, i.e., $98^2/99^2$, etc. Thus 24 switches such as switch 103a having 100 contacts each would be provided to provide a universal spread-matching impedance arrangement.

It will be appreciated that the elements shown in FIG. 4 represent but a portion of the system employed to accommodate all possible spread arrangements. Further in FIG. 4 the gradation between the impedance points along resistance 101 is relatively fine. In contrast, in one embodiment of the invention taps were provided along resistance 101 with 2½ ohms between each pair of taps. In the latter case the upper seven contact points of FIG. 4 indicated by bracket 150 were all connected to a point 980 ohms above ground. Similarly, the points covered by bracket 151 were all connected to the point 977.5 ohms above ground and the points spanned by bracket 152 were connected to the point 975 ohms.

Such an arrangement will be better understood by referring to the more detailed illustration of FIG. 5. A first bank of switches actuated by a coupling member 161 comprises switches 103a, 104a, etc. A second bank of switches 103b, 104b, etc. is actuated by coupling means 162. A third bank of switches 103c, 104c, etc. is actuated by coupling means 163. A fourth bank of switches 103d, 104d, etc. is actuated by a common coupling means 164, and a fifth bank of switches 103e, 104e, etc. is actuated by a common coupling means 165. Each of the first four banks of switches in this embodiment comprised 24-circuit, 24-position units. The fifth bank of switches actuated by coupling means 165 comprised a 24-circuit, 8-position unit. The selector arms of the switches 103a–103e are all connected to a common output channel 120a. Similarly, the selector arms of switches 104a–104e are connected to the common output channel 122a. The upper end of resistance 101 is connected by way of channel 106 to the upper terminal of selector switch 121. Channel 120a is connected to the second terminal of switch 121. Channel 122a is connected to the third terminal of switch 121. Similarly, output conductors or channels leading from successive switches are connected in order to the remaining contacts on switch 121.

In the embodiment above discussed each of the resistances 101a, 101b, 101c, etc. had a value of 2.5 ohms. Consequently, the conductor 171 leading from the juncture between resistances 101a and 101b is connected to the first seven terminals on switch 103a, namely the terminals bearing the indices 100–94, since the ratios of 99/100, 98/99, 97/98, 96/97, 95/94, 94/93, and 93/92 each multiplied by 1,000 ohms are nearer to 980 than 982.5 or 977.5. The conductor 172 connects the 977.5 ohms terminal intermediate resistors 101b and 101c to terminals 93–84 of switch 103a. Conductor 173 connects the 975 terminal between resistances 101c and 101d to terminals 83–78 of switch 103a and also to terminals 77 and 76 of switch 103b. The remainder of the contact points on resistance 101 are connected to terminals on switches 103b, 103c, 103d, and 103e generally in the manner illustrated. The switch terminals of switches 103a–103e as numbered represent an order of progression from 100 to 0. The same identification will appear on like switch positions for switches 104a and 104e and for each of the remaining 22 sets of switches not illustrated in FIG. 5. It should further be noted that the 24th terminal on each of the switch banks is blank. Thus for the setting illustrated in FIG. 5, i.e., switches 103a and 104a set to switch position number 95, a proper voltage variation would appear between conductors 106, 120a and 122a for correcting seismic signals derived in a spread where the remote geophone or detector is 95 geophone intervals from the shot point. The resistance between the selector arm of switch 103 and ground would approximate the expression $$\frac{94^2}{95^2} \times 1000 \ (\pm 1.25 \text{ ohms},$$

the variation permitted by the use of 2½ ohm resistor increments on resistor 101). Thus all an operator need do to provide the proper voltages for producing a family of curves such as illustrated in FIG. 3 would be to determine from the spacing between geophones and the distance from a shot point to the most remote geophone in a spread, the number of the proper integer to select on the selector switches of FIG. 5. One of the coupling means 161–165 would then be actuated properly to set the 24 associated switches whereby there would appear at the terminals of switch 121, a sequence of voltages which are graded in proportion to the squares of the distances from a given shot point to successive detector locations.

While the invention has been described in connection with certain specific embodiments thereof, it will now be understood that further modifications will suggest themselves to those skilled in the art and it is intended to cover such modifications as fall within the scope of the appended claims.

What is claimed is:

1. The combination comprising means for generating at least two signals sequentially and respectively representative of seismic waves appearing at a first detecting station and at a second detecting station spaced a different distance from the source of said seismic waves than said first station, two constant voltage sources bearing a ratio one to the other in proportion to the ratio of the squares of the distances between the detecting stations and said source of seismic waves, adjusting means connected to a first of said voltage sources for adjusting the relative time occurrence of components of signals detected at said first station in dependence upon the product of the contsant voltage from the first of said sources and a preselected geometrical correction function for paths of seismic waves traveling from said source of seismic waves to said first detecting station, means operative intermediate sequential generation of said two signals for connecting said adjusting means to a second of said voltage sources to adjust the relative time occurrence of components of signals detected at said second station in dependence upon the product of the voltage from the second of said voltage sources and said preselected function, and means for recording the adjusted signals.

2. The combination comprising means for generating at least two signals sequentially and respectively representative of seismic waves appearing at a first detecting station and at a second detecting station spaced a different distance from the source of said seismic waves than said first station, a constant voltage source, resistance means connected to said voltage source and having at least two voltage points thereon bearing a ratio one to the other in proportion to the ratio of the squares of the distances respectively between the detecting stations and said source of seismic waves, adjusting means connected to a first of said voltage points for application thereto of a selected fraction of said constant voltage for adjusting the relative time occurrence of components of signals detected at said first station in dependence upon the product of the voltage at the first of said points and a preselected geometrical correction function for paths of seismic waves traveling from said source of seismic waves to said first detecting station, means operative intermediate sequential generation of said two signals for connecting said adjusting means to a second of said voltage points to adjust the relative time occurrence of components of signals detected at said second detecting station in dependence upon the product of the voltage at the second of said voltage points and said preselected function, and means for recording the adjusted signals.

3. The combination comprising means for generating signals sequentially which are representative of seismic waves appearing at detecting stations spaced along a spread from the source of said seismic waves at distances including a maximum distance and intermediate distances, a constant voltage source, resistance means connected to said voltage source for developing voltages at points therealong which differ stepwise and include a maximum voltage and intermediate voltages bearing the same relationships to said maximum voltage respectively as the squares of said intermediate distances bear to the square of said maximum distance, means for adjusting the relative time occurrence of components of said signals in dependence upon the product of a selected fraction of said constant voltage from said resistance means and a preselected time function for geometrical correction of paths of seismic waves traveling from said source of seismic waves to said detecting stations, means operative in synchronism with generation of each of said signals for connecting the adjusting means sequentially to said points on said resistance means, and means for recording the output signals from said adjusting means.

4. The combination comprising means for generating signals sequentially which are representative of seismic waves appearing at detecting stations spaced at equal intervals from the source of said seismic waves at distances including a maximum distance and intermediate distances, a constant voltage source, a resistance means connected to said voltage source for developing a plurality of voltages having values along said resistance means from a maximum voltage down to a reference voltage, selector means for sequentially completing connections to points along said resistance means such that the voltages at said points bear whole number relationships to said maximum voltage which are substantially the same relationships that the squares of said intermediate distances bear to the square of said maximum distance, means for adjusting the relative time occurrence of components of said signals in dependence upon the product of a selected fraction of said constant voltage from said resistance means and a preselected time function for geometrical correction of paths of seismic waves traveling from the source thereof to said detecting stations, means operative in synchronism with generation of each of said signals for stepwise actuation of said selector means, and means for recording the output signals from the adjusting means.

5. The combination comprising means for generating signals sequentially which are representative of seismic waves appearing at detecting stations equally spaced apart and spaced from the source of said seismic waves at distances including a maximum distance and intermediate distances, a constant voltage source, a resistance means connected to said voltage source for developing voltages having different values along said resistance means which range from a maximum voltage down to a reference voltage, selector means for sequentially completing connections to points along said resistance means for selecting intervals between said points such that the voltages at said points bear a whole number relationship to said maximum voltage which are substantially the same relationships that the squares of said intermediate distances bear to the square of said maximum distance, adjusting means for adjusting the relative time occurrence of components of said signals in dependence upon the product of a selected fraction of said constant voltage from said resistance means and a time function preselected for geometrical correction of paths of seismic waves traveling from the source thereof to said detecting stations, means operative in synchronism with generation of each of said signals for stepwise actuating said selector means, and means for recording the output signals from said adjusting means.

6. The combination comprising means for generating signals sequentially which are representative of seismic waves appearing at detecting stations equally spaced apart and spaced from the source of said seismic waves at distances including a maximum distance and intermediate distances, a constant voltage source, a resistance means connected to said voltage source for developing voltages of different values along said resistance means which voltages range from a maximum voltage down to a reference voltage, correcting means adapted to adjust the relative time occurrence of components of said signals in dependence upon the product of an input voltage which is a fraction of said constant voltage and a time function preselected for geometrical correction of seismic waves traveling from said source to said detecting stations, means for establishing a plurality of different groups of points along said resistance means, each group being characterized by relationships $F_k/F_n$ betweeen the magnitudes of said voltages at successive points, $X_0, X_1 \ldots X_n$, in each group given by $$\frac{F_k}{F_n} = \left(\frac{X_k}{X_n}\right)^2$$

where $k$ is an integer representative of the position of any point in any of said groups of points in its numerical order and $n$ is an integer representative of the position of the point of highest numerical order, and means for connecting said correcting means sequentially to each of the points in that group of said points wherein said integer is representative of the numerical position of the respective detecting stations to supply input signals to said correcting means.

7. In a system for sequentially producing signals representative of seismic waves at a first point spaced a maximum distance along a spread from a source of seismic waves and at a second point spaced an intermediate distance from said source, said system having adjusting means for adjusting the time occurrence of components of said signals in dependence upon a preselected geometrical correction function, the combination which comprises means for establishing a constant voltage of maximum magnitude and a constant voltage of intermediate magnitude which bears the same relationship to said voltage of maximum magnitude as the square of said intermediate distance bears to the square of said maximum distance, means operative in timed relation with the initiation of the production of said signals from said first point and second point respectively to apply the maximum and intermediate voltages to said adjusting means to modify said correction function in adjustment of said time occurrence of said components of said signals.

References Cited in the file of this patent

UNITED STATES PATENTS

| | | |
|---|---|---|
| 2,440,971 | Palmer | May 4, 1948 |
| 2,688,124 | Doty | Aug. 31, 1954 |
| 2,800,639 | Lee | July 23, 1957 |
| 2,858,523 | Hawkins | Oct. 28, 1958 |
| 2,876,428 | Skelton | Mar. 3, 1959 |
| 2,879,860 | Tilley | Mar. 31, 1959 |
| 2,976,106 | Piety | Mar. 21, 1961 |
| 2,990,535 | Parkinson | June 27, 1961 |